Patented Nov. 22, 1927.

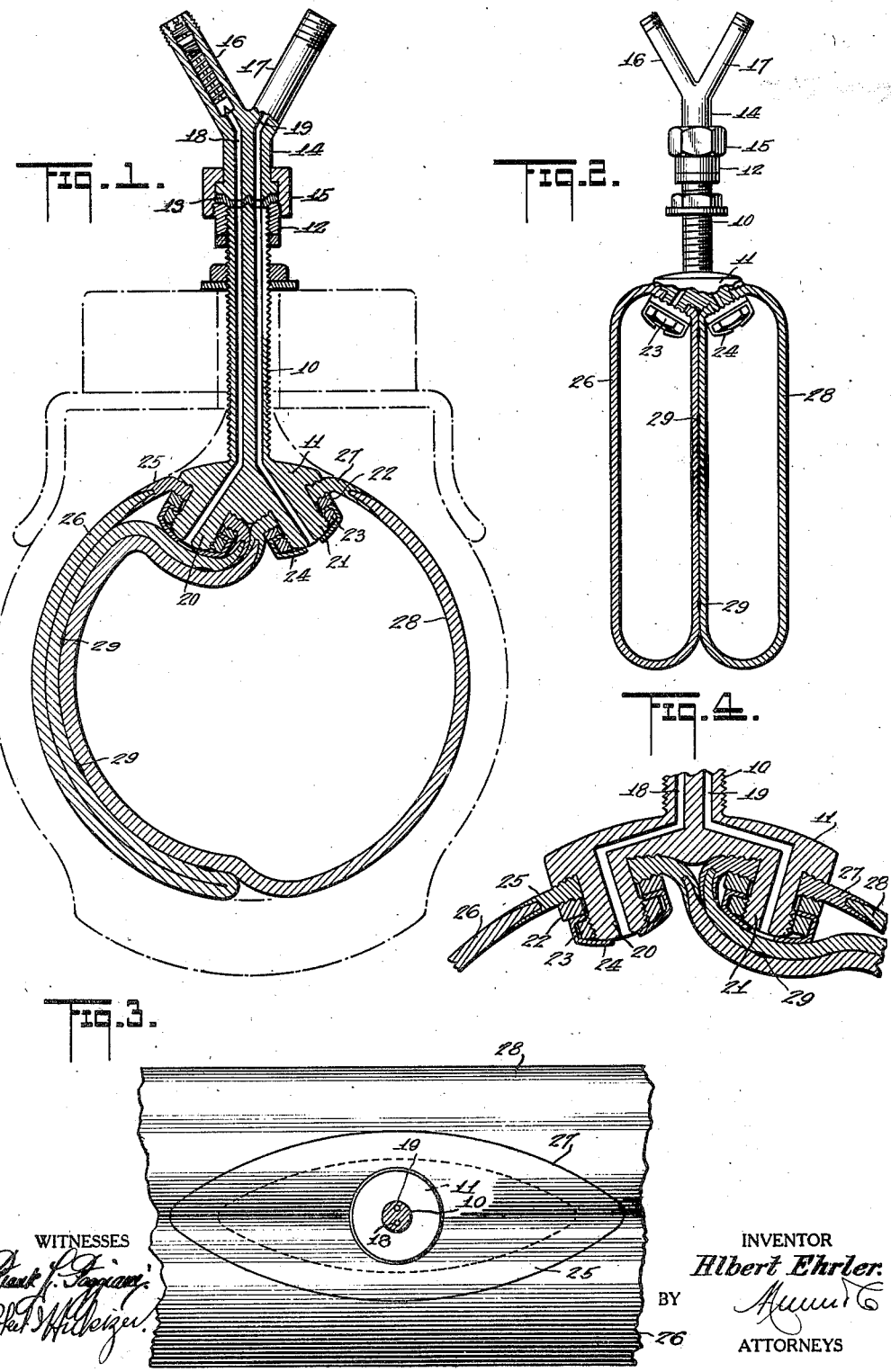

1,650,502

UNITED STATES PATENT OFFICE.

ALBERT EHRLER, OF NEW YORK, N. Y., ASSIGNOR OF FORTY-NINE ONE-HUNDREDTHS PART TO ERMINIO GUERCI, OF NEW YORK, N. Y.

AUTOMOBILE TIRE VALVE FOR MULTIPLE AIR TUBES.

Application filed March 28, 1925. Serial No. 19,142.

This invention relates to an automobile tire valve for multiple air tubes. An object of the invention is to provide a plurality of tubes within an automobile shoe so that if one is punctured the other can be readily put into use.

Another object concerns the provision of means whereby the standard type wheel or rim and shoe can be used in connection with my invention.

The invention is illustrated in the drawings, of which—

Figure 1 is a vertical section through the valve and the tubes;

Fig. 2 is a similar section showing the tubes removed from the shoe and deflated;

Fig. 3 is a section through the valve stem; and

Fig. 4 is a partial section of a modified form of valve stem.

The forms of the invention shown in the drawings are preferred forms, although it is understood that other modifications in the construction and arrangement of the parts and in the character of the materials used may be adopted without departing from the spirit of the invention as set forth in the appended claim.

In general, the invention comprises a valve stem in which a plurality of air passages are disposed. This stem is provided at its bottom with an enlarged base having separate nipples for each air passage, a separate inner tube being connected to each nipple. Preferably there are two nipples adapted to be connected to two tubes, although more may be provided. In the manufacture of the device, an inner tube patch is connected to each nipple and suitably fastened thereto, and then an inner tube is vulcanized or otherwise connected to the edges of the patch. This permits the nipple and the clamping nuts and similar elements to be connected to the patch. The valve stem is provided with necks having suitable valve mechanisms in each, the mechanisms being standard, so that one or the other of the inner tubes can be inflated or deflated, as desired.

In the preferred form shown in the drawings, I provide a valve stem 10 having a base 11, a rim sleeve 12 and a contacting disk 13 against which the upper end 14 of the stem is clamped by means of a clamping collar 15. The lower end of the stem portion 14 and the upper end of the stem 10 may be made irregular, so that the rubber disk 13 will be gripped in such manner by reason of the irregularity that it will not tend to rotate and possibly choke off the air passages. The upper end of the stem is provided with two separate necks 16 and 17 with valve mechanisms of suitable standard type and connected to passages 18 and 19 leading to nipples 20 and 21 in the base 11. Clamping nuts 22 and 23 are threaded on to each nipple and are provided with a hollow plate 24 of any suitable design to hold them thereon. These nuts are adapted to clamp patches such as 25 and 27 against the base, and to the edges of these patches inner tubes 26 and 28, respectively, are adapted to be cemented or vulcanized. It is observable that it is possible to fasten the patches 25 and 27 to the nipples by means of nuts and locking plates, and then fasten the tubes thereto, or by any other process, such as cutting a small aperture opposite to the nipple hole in the tube, spreading out said aperture so that the clamping nut may be introduced through the aperture and fixed on to the nipple. The aperture is to be patched after the clamping nut has been fixed.

In the form shown in Fig. 1, the tube 28 is inflated and the tube 26 is deflated; whereas, when the tube 28 is punctured, it is merely necessary to blow up tube 26 and deflate tube 28.

The modified form of the invention shown in Fig. 4 is merely a change in the shape of the valve-stem base to provide for a wider rim.

In the operation of the device, it is observable that the valve is of standard type, although provided with more than one air passage. Sometimes more than two nipples may be provided on the base, if desired, so that more than two tubes can be used.

In Fig. 1 it will be observed that the tubes along the adjacent surfaces are preferably held together by suitable means such as small areas of cement or adhesive 29, so that as the one tube is inflated its movement will properly and directly influence the movement of the other.

What I claim is:—

A stem for a pneumatic tire valve, comprising an inner externally threaded section having at its inner end an enlarged integral base having a curved outer face and terminating in two spaced shouldered and threaded nipples, the stem having two longitudinal passages leading out through the nipples, nuts on the nipples, an outer section having two longitudinal passages and provided with two diverging tubular necks, a valve in each neck, and means for detachably securing the sections together in alinement.

ALBERT EHRLER.